United States Patent [19]

Day

[11] 4,312,648
[45] Jan. 26, 1982

[54] POCKET FILTER ARRANGEMENT

[75] Inventor: Charles E. Day, Jeffersonville, Ind.

[73] Assignee: American Air Filter Company, Inc., Louisville, Ky.

[21] Appl. No.: 214,270

[22] Filed: Dec. 8, 1980

[51] Int. Cl.³ .............................................. B01D 46/02
[52] U.S. Cl. .......................................... 55/378; 55/380; 55/483; 55/484; 55/DIG. 12; 210/323.2
[58] Field of Search .................... 55/15, 378, 380, 483, 55/484, 511, DIG. 12, 379; 210/323.2, 459

[56] References Cited

U.S. PATENT DOCUMENTS

| | | | |
|---|---|---|---|
| 2,499,949 | 3/1950 | Glanzer et al. | 55/484 |
| 3,131,044 | 4/1964 | Springer | 55/378 |
| 3,190,059 | 6/1965 | Bauder et al. | 55/511 |
| 3,422,602 | 1/1969 | Janson | 55/DIG. 12 |
| 3,871,848 | 3/1975 | Smith | 55/483 |
| 3,997,305 | 12/1976 | Ulvestad et al. | 55/379 |

FOREIGN PATENT DOCUMENTS 32580  6/1921  Norway ........................... 210/323.2

OTHER PUBLICATIONS

Soloff, R., New Concepts in Ultrasonic Sealing, an Engineering Special, Mar. 1964, pp. 125–127.

Primary Examiner—David L. Lacey
Attorney, Agent, or Firm—Thomas G. Anderson

[57] ABSTRACT

A pocket filter cartridge having a plurality of side-by-side filter assemblies secured to a common mounting frame adapted to be secured across a dirty gas stream in a gas duct. Each of the filter assemblies includes a sheath-like filter bag suspended from an apertured header plate which is secured to the mounting frame in an overlapping fashion with its adjacent mounting plates to form a common header for all of the filters in the cartridge.

6 Claims, 6 Drawing Figures

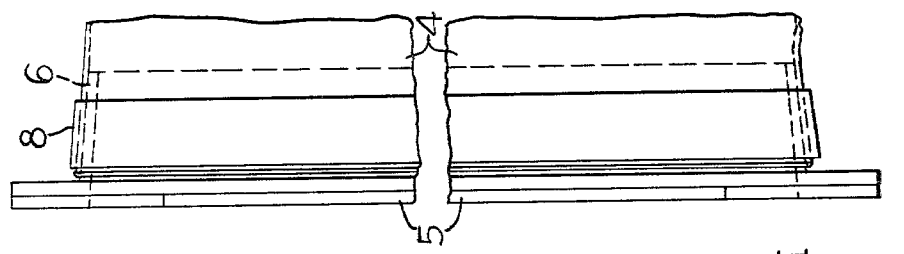
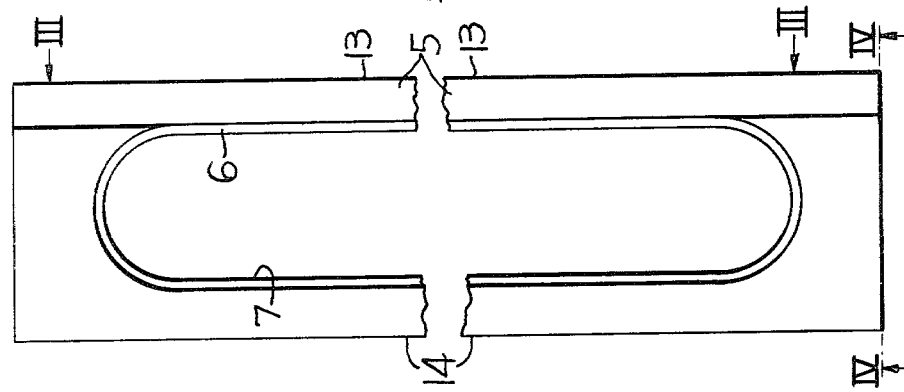
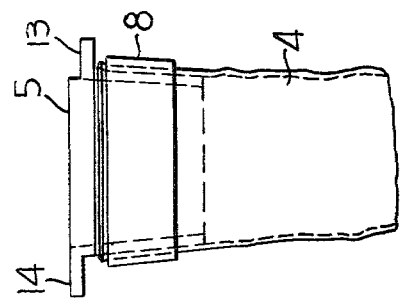
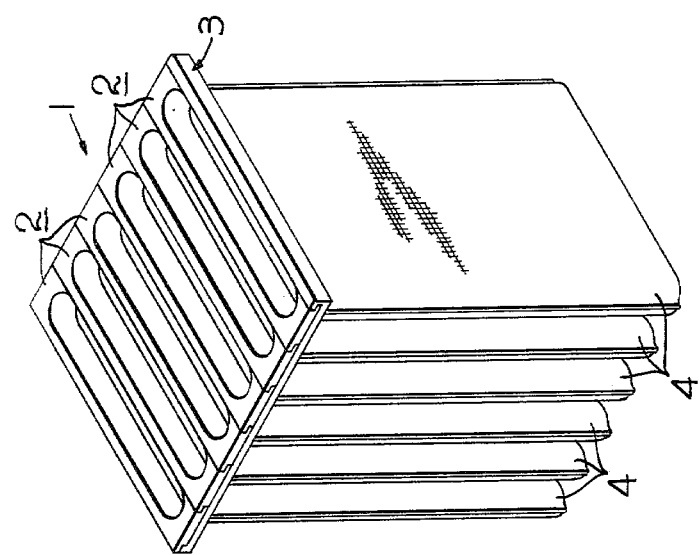

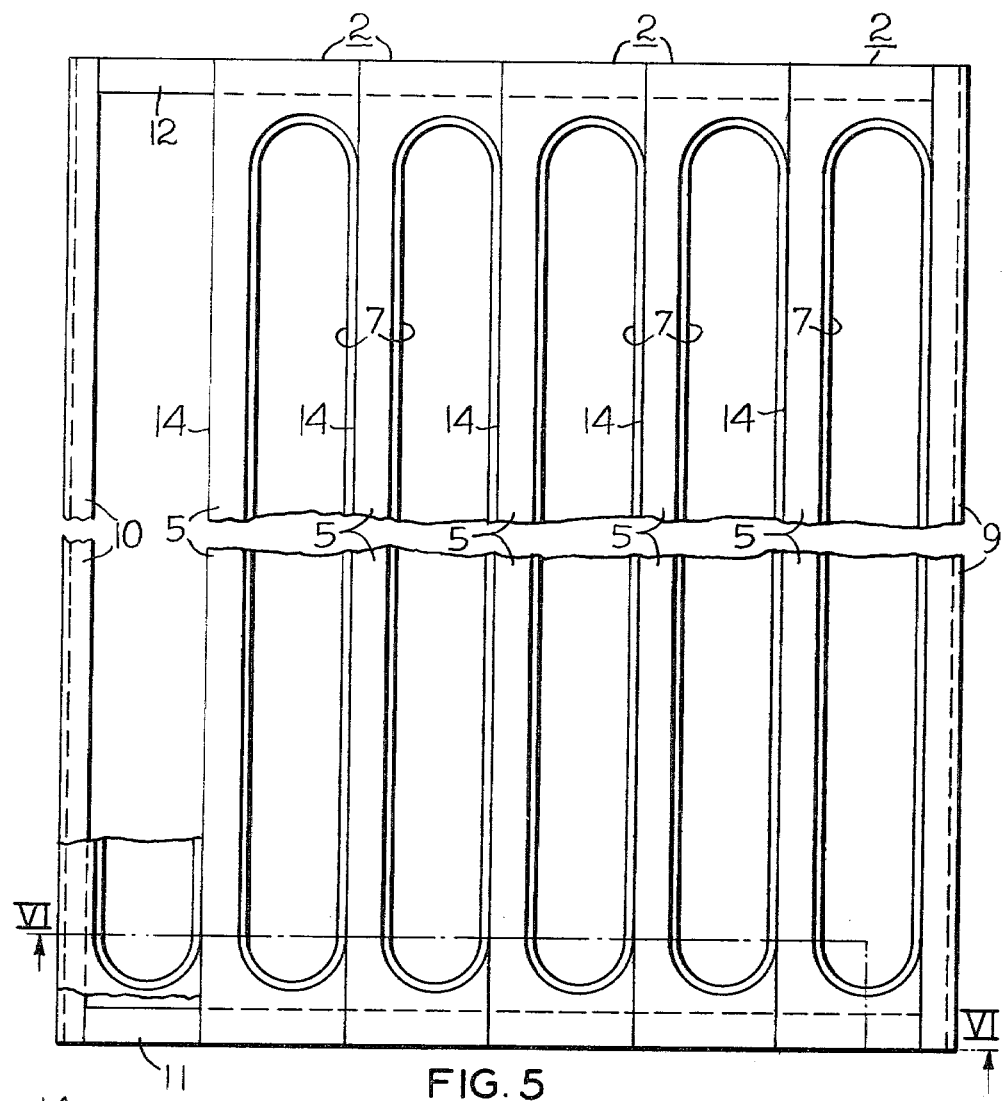
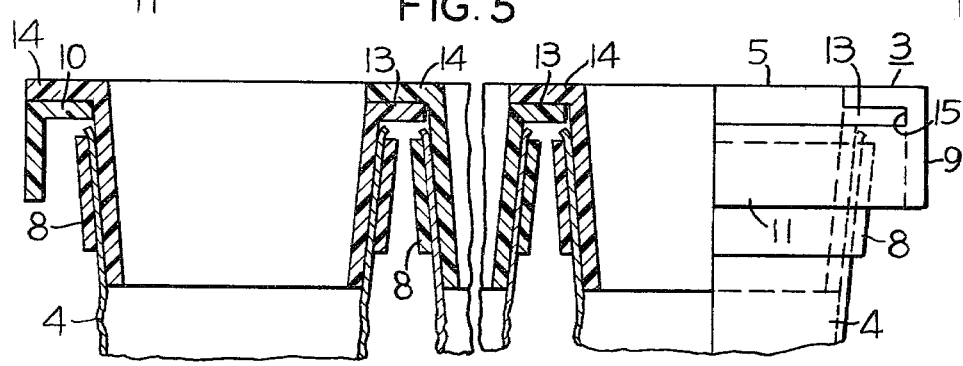

POCKET FILTER ARRANGEMENT

BACKGROUND OF THE INVENTION

1. Field of the Invention

The present invention relates to gas separation devices and in particular to a pocket filter arrangement for removing particulate solids from a dirty gas stream.

2. Description of the Prior Art

As exemplified by U.S. Pat. Nos. 3,190,059 and 3,871,848, the prior art discloses a variety of pocket filter arrangements. As shown in the foregoing patents, a pocket filter generally includes a plurality of relatively flat, sheath-like filter bags secured to a common mounting frame to form a filter cartridge having a series of filter pockets suspended from the frame in adjacent side-by-side relation. Typically, one or more of the cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge is installed in its place. Thus, it is particularly desirable for the filter cartridge to be of a durable and lightweight construction which is easy to assemble and inexpensive to make.

SUMMARY OF THE INVENTION

The present invention relates to gas separation devices and in particular to a filter header arrangement in a pocket filter cartridge suitable for removing particulate solids from a dirty gas stream.

The filter cartridge includes a plurality of filter assemblies affixed to a mounting frame which is adapted to be secured across the dirty gas stream. Each of the filter assemblies includes a relatively flat, sheath-like filter bag which is suspended from an apertured header plate secured to the mounting frame of the filter cartridge. The header plates are affixed to the mounting frame in an overlapping, side-by-side fashion to form the filter cartridge so that the filter bags are suspended from the frame in parallel spaced relation.

From the foregoing, it can be seen that the filter cartridge embodying the invention is of a relatively lightweight and durable design which is easy to fabricate and assemble. However, it is to be understood that various changes can be made in the arrangement, form and construction of the apparatus disclosed herein without departing from the spirit and scope of the invention.

DESCRIPTION OF THE DRAWINGS

FIG. 1 is an isometric view of the filter cartridge;

FIG. 2 is an enlarged partial plan view of one of the filter assemblies shown removed from the filter cartridge;

FIG. 3 is a partial side view taken substantially along line III—III in FIG. 2;

FIG. 4 is a partial end view taken substantially along line IV—IV in FIG. 2;

FIG. 5 is an enlarged partial plan view of the filter cartridge shown in FIG. 1; and FIG. 6 is a further enlarged partial cross-sectional view taken generally along line VI—VI in FIG. 5.

DESCRIPTION OF THE PREFERRED EMBODIMENT

As shown in FIG. 1, the filter cartridge 1 includes a plurality of parallel side-by-side filter assemblies 2 secured to a generally rectangular mounting frame 3 which is adapted to be removably secured across a dirty gas stream in a gas duct. As discussed above in regard to the prior art, this type of cartridge is typically secured across the gas duct so that particulate materials are separated from the gas stream as it flows through the filter media from the interior of each of the filter assemblies.

Referring to FIGS. 2-4, each of the filter assemblies 2 includes a relatively flat, sheath-like filter bag 4 which is suspended from an apertured header plate 5. The header plate 5, like all of the components of the filter cartridge except for the filter bags, is preferably formed of a high impact polystyrene plastic and includes a projecting peripheral lip portion 6 forming the marginal edge of an elongated aperture 7 opening into the open end of the filter bag 4. This arrangement accommodates fastening the open end of the filter bag 4 to the header plate 5 by means of a retaining collar 8 sized to surround the filter to secure it to the lip portion 6 in a clamping press-fit fashion as shown in the drawings. In this regard, it is to be understood that the retaining collar may also be sonically welded to the lip portion to further secure the filter, or alternatively, an appropriate adhesive may be used to glue each of the filter bags to its respective lip portion.

As shown in FIGS. 5 and 6, the mounting frame 3 includes a channel-shaped sealing strip or member 9 spanning one side of the frame, a flat sealing strip or member 10 spanning the other side of the frame, and a pair of transverse members 11 and 12 interconnecting the ends of the sealing strips 9 and 10. This arrangement accommodates securing the header plates 5 across the mounting frame 3 in the overlapping side-by-side fashion shown in the drawings to form a common header for all of the filter bags in the filter cartridge.

As shown in the drawings, each of the header plates 5 is provided with oppositely projecting edge portions or flanges 13 and 14 of a common thickness along the entire length of the plate. The edge portions 13 and 14 are planarly offset from one another a distance substantially the same as their thickness to form the overlapping joints between the adjacent plates, such as shown in FIG. 6, while also accommodating seaing engagement between the ends of the header plates 5 and the transverse frame members 11 and 12.

When assembling one of the filter cartridges, the workman first assembles all of the filter assemblies 2 required for the cartridge. Then, starting at the right side of the mounting frame 2 as it is shown in the drawings, he slides the outermost edge portion 13 of one of the filter assemblies into the notch 15 in the channel-shaped sealing strip 9 so that it is aligned in the mounting frame as generally shown in the drawings. Next, the remaining filter assemblies 2 are sequentially assembled on the frame, proceeding from right to left, until the outer edge portion 14 of the leftmost filter assembly is engaged on the flat sealing strip 10. Thereafter, the overlapping edge portions are secured together and the plates are secured to the frame by sonic welding in dust-tight sealing relation, although it is to be understood that as in the case of the filter assemblies 2, an appropriate adhesive may alternatively be used for this purpose.

From the foregoing, it can be seen that the invention contemplates a durable yet easily assembled filter cartridge in which all of the components except the filter bags can be formed by any one of many well known, yet inexpensive, plastic injection molding processes. High impact polystyrene plastic has been found particularly suited to this purpose. Moreover, the relatively lightweight construction of the cartridge makes it easy for a workman to handle during its assembly as well as being easy to install and remove in the field.

The embodiments of the invention in which an exclusive property or privilege is claimed are defined as follows:

1. A pocket filter cartridge for removing particulate solids from a dirty gas stream, comprising:

a plurality of relatively flat, sheath-like filter bags open at one end;

a filter bag mounting frame adapted to be secured across the dirty gas stream;

a plurality of apertured bag header plates secured across the mounting frame in overlapping side-by-side relation;

each of said header plates having oppositely projecting edge portions and a projecting peripheral lip portion forming the marginal edge of an aperture opening into the open end of one of the filter bags;

said edge portions overlapping the adjacent edge portions of the plates next to it;

fastening means securing the open end of each of the filter bags to one of said lip portions; and said mounting frame having an interlocking channel portion spanning one side of the frame and a sealing edge portion spanning the other side of the frame; and said channel portion receiving the outer edge portion of the outermost plate at said one side of the frame and said sealing edge portion cooperating with the outer edge portion of the outermost plate at said other side of the frame.

2. The pocket filter cartridge according to claim 1, and said fastening means being a retaining collar sized to surround each of the filter bags and secure it to a respective lip portion in clamping press-fit relation.

3. The pocket filter cartridge according to claim 1, and said mounting frame and header plates being formed of a high impact polystyrene plastic material.

4. The pocket filter cartridge according to claim 3, and wherein said header plates are secured to the mounting frame by a plurality of sonic welds and said overlapping edge portions are secured together in dust-tight sealing relation by a plurality of sonic welds.

5. The pocket filter cartridge according to claim 1, and each of said header plates being of an elongated rectangular configuration sized to cooperate with the other of said plates to enclose the mounting frame.

6. The pocket filter cartridge according to claim 1, and said oppositely projecting edge portions being of a common thickness and extending in a plane offset one from the other a distance substantially the same as the thickness of said edge portions.

* * * * *